H. UNVERZAGT.
MORTISING MACHINE.
APPLICATION FILED AUG. 13, 1910.

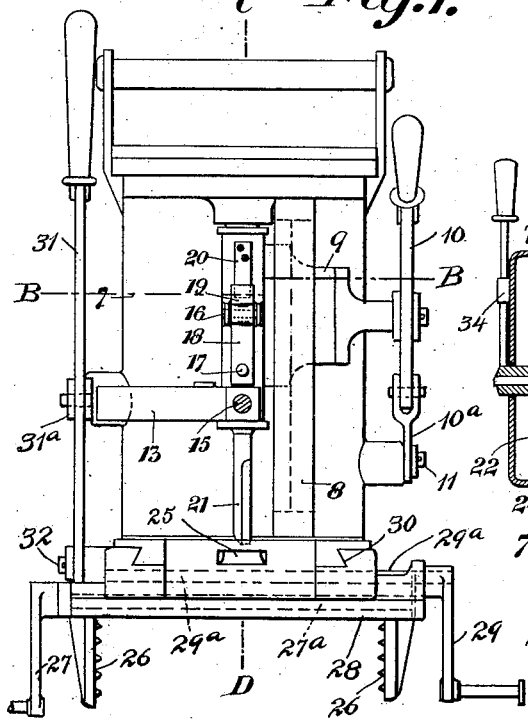
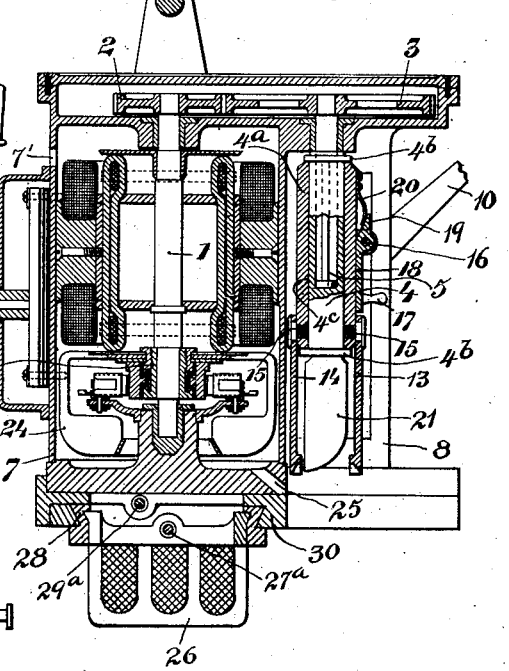

1,048,113.

Patented Dec. 24, 1912.

2 SHEETS—SHEET 2.

Witnesses:

Inventor
Hermann Unverzagt
By B. Singer
Attorney

UNITED STATES PATENT OFFICE.

HERMANN UNVERZAGT, OF NORDHAUSEN, GERMANY.

MORTISING-MACHINE.

1,048,113.  Specification of Letters Patent.  Patented Dec. 24, 1912.

Application filed August 13, 1910. Serial No. 577,076.

*To all whom it may concern:*

Be it known that I, HERMANN UNVERZAGT, engineer, a subject of the German Emperor, residing at Nordhausen, Kingdom of Prussia, Germany, have invented certain new and useful Improvements in Mortising-Machines, of which the following is a specification.

My present invention relates to portable mortising machines in which a suitably cased motor may be provided, geared to operate a drilling tool; a set of chisels being arranged to coact with the drilling tool to complete the mortise.

The principal objects of my invention are to provide, by the disposition of parts, a compact mortising machine in which an electric motor may be suitably cased to protect the same from dust and shavings and also to protect the operator of the machine from the rotating parts of the motor; and, to provide means whereby the chisels of the machine may be swung and retained out of operative relation to the drilling tool, and the machine used as a driller or, when in operative relation to the drilling tool, to complete the mortise started by the latter.

The machine is so constructed that the feeding of the tools to the material is done manually, thus providing the mortise without heating or undue wear upon the tools.

Figure 5:
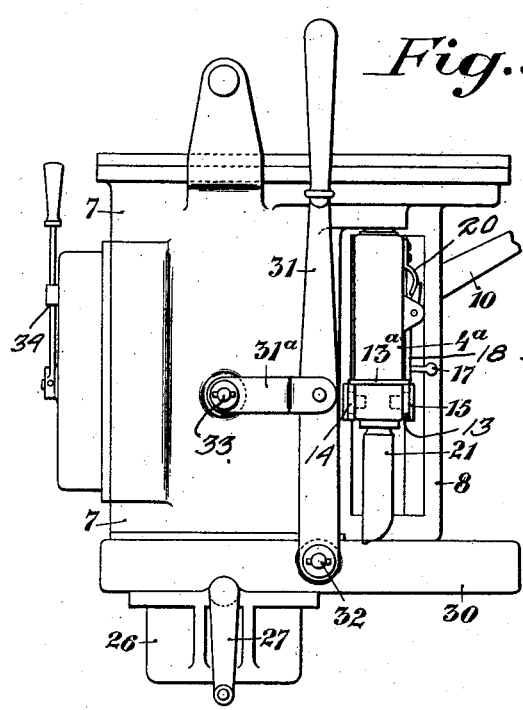
Figure 6:
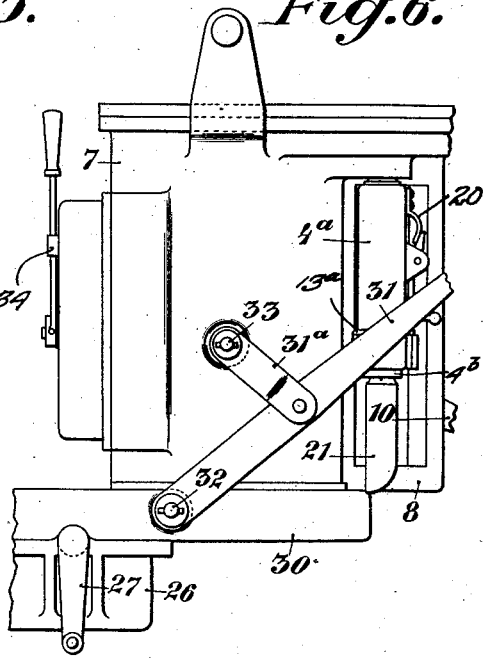
Figure 7:
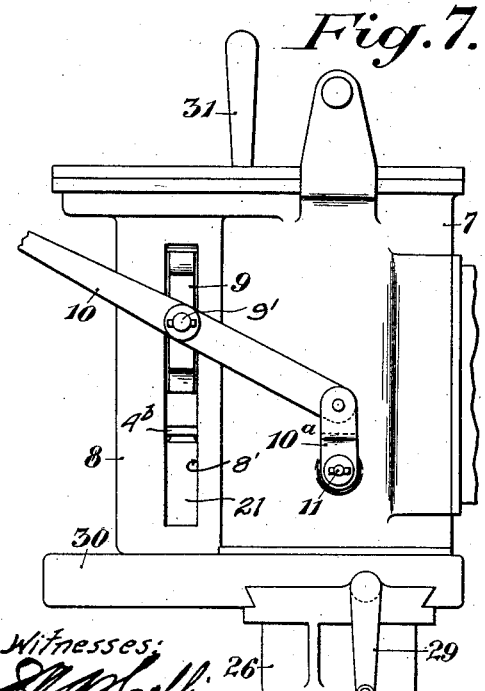
Figure 8:
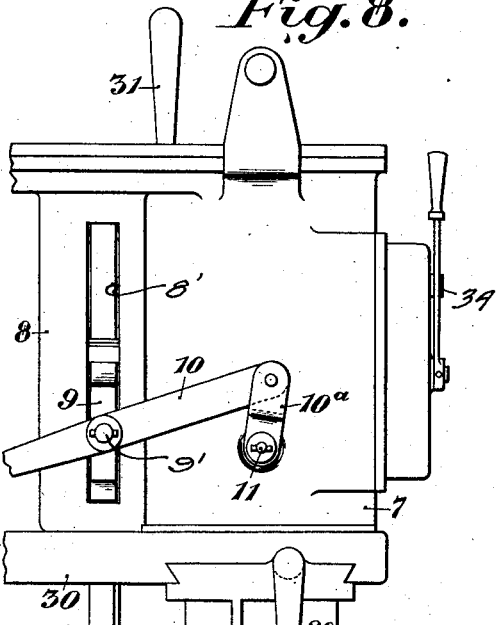

In the drawings, forming a part of this specification:—Figure 1 is front elevation of a mortising machine embodying my invention, its chisels being swung out of operative relation to the drilling tool. Fig. 2 is a cross sectional view taken on substantially the line A—B of Fig. 1. Fig. 3 is a vertical sectional view on the line C—B of Fig. 1, the chisels being swung into operative relation to the drilling tool. Fig. 4 is a plan view of a fan used in connection with the machine. Fig. 5 is a side elevation of the machine, looking toward the right of the same, as disclosed in Fig. 1. Fig. 6 is a view similar to Fig. 5, but showing the tool actuating and supporting structure shifted relative to its clamping means for securing the machine to the work. Fig. 7 is a side elevation of the machine looking toward the left of the same as disclosed in Fig. 1. Fig. 8 is a view similar to Fig. 7, but showing the drilling tool bent downwardly.

Similar characters refer to similar parts throughout the several views.

Revolubly mounted in a casing 7, is a drive spindle 1 operatively connected to a spindle 5 through gear wheels 2 and 3, rigidly carried by said spindles 1 and 5, respectively. Carried by the casing 7, and parallel with the axis of spindle 5, is a guide 8 having a vertically disposed slot 8′ and a dove-tail slot 8″ adapted to receive a vertically movable member 4ª, hereinafter termed "tool feeding member", which is provided with a dove-tailed portion 6 and a lateral extension 9, which work in the slots 8′ and 8″ respectively, of the guide 8. The tool feeding member has an elongated bore 4ᶜ axially alined with spindle 5. Reciprocable movement is imparted to the tool feeding member by means of a lever 10, pivoted to the casing 7, as by links 10ª oscillatable about pivot 11, the lever 10 being pivotally connected to a stub shaft 9′ of the extension 9, as clearly shown in Figs. 7 and 8 of the drawing.

As shown in Figs. 2 and 3 of the drawing, the spindle 5 imparts rotation to a sleeve 4, longitudinally movable with respect to the said spindle through a key and keyway, clearly shown in Figs. 2 and 3, or other suitable means. The said sleeve 4 is adapted to receive a drilling tool 21, and is disposed intermediate the spindle 5 and the tool feeding member 4ª, and reciprocable with the latter, through the collars 4ᵇ, but rotatively carried in the said bore 4ᶜ.

The tool feeding member 4ª is provided with two oppositely disposed chisels 13 and 14, pivoted thereto, as at 15, equidistant from the sides and top of the chisels. The chisels are connected by a bridging piece 13ª, and are adapted to lie longitudinally adjacent the drilling tool, to coöperate therewith to form a mortise, or to be swung out of operative relation to the drilling tool 21, whereby the latter may be operated independently of the chisels. Catch mechanism, which comprises a pawl 18, pivoted to the member 4ª at 16 and normally held in engaging relation with either the top or one side of the chisel 13 by a spring 20 acting upon the projection 19 of the pawl 18, holds the chisels either in or out of operative relation to the drilling tool. A handle 17 is carried by pawl 18 to facilitate manual actuation of the same. As shown in Fig. 1, the pawl may be drawn out and the chisel swung to a horizontal position, after which the pawl is returned to its normal position engaging the side of the chisel 13, and through bridge piece 13ᵃ, holding them both in a set position. This locking action also takes place when the chisels are in a vertical position, as clearly shown in Fig. 3 of the drawing, the pawl 18 engaging the top of the chisel 13.

For the purpose of securing the machine to the work, for instance a beam, jaws 26 are provided which may be moved toward or from each other by rotating a screw spindle 27ᵃ, operatively connecting the jaws, in the usual manner, a crank 27 being provided to facilitate rotation of said spindle. The jaws 26 are movably carried by a carriage 28, disposed transversely of the beam and movable at a right angle with respect to a carriage 30. This carriage 30 extends longitudinally of the beam and carries the casing 7, which latter may be moved longitudinally of said carriage. The jaws 26 are operatively carried by carriage 28; carriage 28 is operatively carried by carriage 30; and, the carriage 30 is operatively carried by the casing 7, as by dove-tailing or other equivalent means.

Movement of that portion of the machine above carriage 28, transversely of the beam, is accomplished by a screw spindle 29ᵃ, provided with a crank 29, which moves the carriage 30 with respect to the carriage 28. Movement of the casing 7 longitudinally of the carriage 30, and consequently longitudinally of the beam, is accomplished by means of the lever 21, pivoted to the casing 7, as by links 31ᵃ, pivoted to stub shaft 33, the end of the lever 31 being pivoted, as by pin 32, carried by the carriage 30.

As shown in Fig. 3, the armature 23 of the motor spindle 1 has provided at its lower end, a fan 24. The casing 7 is provided with an air inlet 7′ and outlet 25, the latter being arranged to direct the air generated by the fan to the working portion of the tools. A rheostat 34 may be provided to control the speed of the motor.

The operation of the machine is as follows:—The machine is secured to the work as previously described, and that portion of the material to be mortised is located directly under the drilling tool, by means of the crank 29 and lever 30, together with their coacting parts. The drilling tool is then rotated by means of the motor, its speed being controlled by rheostat 34, and the drilling tool is fed manually to the work by means of the lever 10. This drilling is followed by the use of the chisels which are reciprocated manually with the tool carrier 4ᵃ by the lever 10.

From the foregoing description, it is made manifest that I provide a mortising machine which may be used as a drilling machine, the construction being such that the chisels may be quickly swung to such a position as to not interfere with the free action of the drilling tool, and that the chisels or drilling tool may be operated independently of each other or in conjunction with each other.

I claim:—

1. In a mortising machine, the combination of a movable tool feeding member, means for manually reciprocating said tool feeding member, a drilling tool revoluble relative to said tool feeding member and reciprocable therewith, a chisel pivotally carried by said tool feeding member, normally positioned to lie longitudinally adjacent the said drilling tool to coöperate therewith to form a mortise, but adapted to be swung out of said normal position to permit the drilling tool to operate independently of said chisels, and mechanism for retaining said chisels either in or out of operative relation to said drilling tool, substantially as and for the purpose set forth.

2. In a mortising machine, the combination of a movable tool feeding member, means for manually reciprocating said tool feeding member, a drilling tool revoluble relative to said tool feeding member, but reciprocable therewith, two chisels pivotally carried by said tool feeding member, normally positioned one at each side of said drilling tool, to coöperate therewith to form a mortise, but adapted to be swung out of said normal position to permit the drilling tool, to operate independently of said chisels, a bridge member connecting said chisels, and mechanism carried by said tool feeding member, operable upon one of said chisels to retain them both either in or out of operative relation to said drilling tool, substantially as and for the purpose set forth.

3. In a mortising machine, the combination of a reciprocable tool feeding member, a drilling tool revoluble relative to said tool feeding member, and reciprocable therewith, a chisel, means pivoting said chisel to said tool feeding member at a point equi-distant from the top and one side of the chisel, to normally position the same longitudinally adjacent the said drilling tool to coöperate therewith to form a mortise, but adapted to be swung out of said normal position to permit the drilling tool to operate independently of said chisel, and a pawl carried by said tool feeding member adapted to engage either the top of said chisel or the said side thereof relative to which said pivoting means is positioned, to retain said chisels either in or out of operative relation to said drilling tool, substantially as and for the purpose set forth.

4. In a mortising machine, the combination of a reciprocable tool feeding member, a drilling tool revoluble relative to said tool feeding member and reciprocable therewith, two chisels, means pivoting said chisels to said tool feeding member at a point equidistant from the top and side of each of said chisels, to normally position the chisels longitudinally adjacent, one at each side of said drilling tool to coöperate therewith to form a mortise, but adapted to be swung out of said normal position to permit the drilling tool to operate independently of said chisel, a bridge member connecting said chisels, and a pawl carried by said tool feeding member adapted to engage either the top of one of said chisels, or the said side thereof, relative to which said shifting means is positioned, to receive both of said chisels either in or out of operative relation to said drilling tool, substantially as and for the purpose set forth.

5. In a mortising machine, the combination of a spindle, a guide provided with a guide slot disposed parallel to the axis of said spindle, a tool feeding member movably carried by said guide and reciprocably guided by said guide slot thereof, a sleeve revoluble with said spindle but longitudinally movable with respect thereto and revolubly carried by said tool feeding member and reciprocable therewith, a drilling tool carried by said sleeve, chisels carried by said tool feeding member to coöperate with said drilling tool to form a mortise, and means for normally reciprocating said tool feeding member, substantially as and for the purpose set forth.

In testimony whereof I have hereunto set my hand in presence of two subscribing witnesses.

HERMANN UNVERZAGT.

Witnesses:
ERNST EBERHARDT,
OSKAR HEIMANN.

Copies of this patent may be obtained for five cents each, by addressing the "Commissioner of Patents, Washington, D. C."